Patented Nov. 14, 1950

2,529,591

UNITED STATES PATENT OFFICE 2,529,591

PREPARATION OF SYNTHETIC RESINS FROM A DICHLOROALKANE AND A HYDROCARBON FRACTION CONTAINING CHLORO-AROMATIC HYDROCARBONS

Herman S. Bloch, Chicago, Ill., assignor to Universal Oil Products Company, Chicago, Ill., a corporation of Delaware No Drawing. Application December 21, 1946, Serial No. 717,801

5 Claims. (Cl. 260—2)

1

This application is a continuation-in-part of my copending application Serial No. 500,424 filed August 28, 1943, now abandoned.

This invention relates to the preparation of resins. More specifically, the invention is concerned with the manufacture of a clear, hard, transparent resin, suitable for use in the production of lacquers, varnishes, and other coating compositions.

An object of this invention is to prepare a synthetic resin with a melting point above about 65° C.

Another object of this invention is to produce a resin having high solubilities in organic solvents.

One specific embodiment of this invention relates to a process for producing a resin which comprises reacting a polyhaloalkane and a straight-run petroleum naphtha fraction containing paraffins, cycloparaffins, and alkyl aromatic hydrocarbons having at least two replaceable nuclear hydrogen atoms per molecule in the presence of a Friedel-Crafts metal halide catalyst.

Another embodiment of this invention relates to a process for producing a resin which comprises reacting a dichloroalkane having from two to five carbon atoms per molecule and a straight-run petroleum naphtha fraction containing paraffins, cycloparaffins, and alkyl aromatic hydrocarbons having at least two replaceable nuclear hydrogen atoms per molecule in the presence of a Friedel-Crafts metal halide catalyst.

Still another embodiment of this invention relates to a process for producing a resin which comprises reacting a dichloroalkane having from two to five carbon atoms per molecule and a straight-run petroleum naphtha fraction containing paraffins, cycloparaffins, and alkyl benzene hydrocarbons having two replaceable nuclear hydrogen atoms per molecule in the presence of a Friedel-Crafts metal halide catalyst.

A still further embodiment of this invention relates to a process for producing a resin which comprises reacting a dichloroalkane having from two to five carbon atoms per molecule and a straight-run petroleum naphtha fraction containing paraffins, cycloparaffins, and alkyl benzene hydrocarbons having at least two replaceable nuclear hydrogen atoms in the presence of an aluminum chloride catalyst.

Straight-run petroleum naphtha fractions containing only paraffinic, cycloparaffinic, and aromatic hydrocarbons including monoalkyl and dialkyl aromatic hydrocarbons are preferred charging stocks for the production of resins as the alkyl aromatic hydrocarbons contained therein may be utilized without the need of separating these hydrocarbons from the saturated hydrocarbons also present in the naphtha. The straight-run petroleum naphtha thus serves as a relatively inexpensive source of suitable alkyl aromatic hydrocarbons.

Straight-run naphtha fractions are chosen as charging stocks for this process rather than cracked naphtha fractions as the latter fractions contain olefins as well as paraffins, cycloparaffins, and aromatics. The olefin content of a cracked naphtha interferes with the smooth operation of my resin-forming process, since in the presence of a Friedel-Crafts metal halide catalyst such olefins react with the aromatic hydrocarbons producing alkyl aromatic hydrocarbons that may not contain two replaceable nuclear hydrogen atoms, and consequently such highly alkylated aromatic hydrocarbons will not react with a dihaloalkane to produce long-chain high molecular weight condensation products with resin-like properties. Although some resin formation may occur when charging a cracked naphtha, the highly alkylated aromatic hydrocarbons produced simultaneously are accordingly present in the reaction products containing the resinous material and they impart a stickiness and tackiness to the resin as they are not separable therefrom by simple and inexpensive means. Also some olefin polymerization occurs and some of the olefins of the cracked naphtha combine with the metal halide catalyst forming sludge. Such sludge formation thus causes a loss in the active life of the catalyst.

Although the preparation of resinous material from aromatic hydrocarbons and alkylene dihalides is fairly well-known, I have found that an entirely new, higher molecular weight varnish resin of higher melting point may be obtained by operating at the conditions of my invention. It is also possible by employing the present process to obtain increased yields of a clear, transparent varnish resin which is soluble in commonly used paint solvents and has a melting point above about 65° C.

A feature of this invention is an improvement in the preparation of synthetic resins by reacting hydrocarbon fractions containing alkyl aromatic hydrocarbons, paraffins and naphthenes with polyhaloalkanes which comprises employing carefully controlled quantities of reactant materials so that after the completion of the condensation reaction, the excess of unreacted polyhaloalkane is present in at least twice the molecular proportion of the sum of the molecular proportions of the saturated paraffinic and cycloparaffinic hydrocarbons also present in the reaction products.

Chloro-aromatic hydrocarbons containing one or two chlorine atoms attached directly to the aromatic ring may also be added to the straight-run naphtha fraction to form a fraction containing alkyl aromatic and chloro-aromatic hydrocarbons in order to produce a resin with somewhat different properties than that derived from the alkyl aromatic and the charged polyhaloalkane. The aromatic compounds which are thus utilizable in admixture with the paraffins and cycloparaffins (commonly called naphthenes) of the charged straight-run naphtha fraction, may be represented by the formula $R^1$—Ar—$R^2$ wherein $R^1$ represents a member of the group consisting of a chlorine atom and an alkyl group generally of less than five carbon atoms, $R^2$ represents a member of the group consisting of a hydrogen atom, a chlorine atom, and an alkyl group generally of less than five carbon atoms, and Ar represents an aromatic hydrocarbon group having at least two replaceable nuclear hydrogen atoms. The aromatic compounds so utilizable in the process include toluene, ethylbenzene, propyl-, butyl-, and amylbenzenes, xylenes, di-ethylbenzenes, di-propylbenzenes, more highly alkylated benzene hydrocarbons containing at least two replaceable nuclear hydrogen atoms, and also alkyl naphthalenes, other alkylated polycyclic aromatic hydrocarbons, chlorobenzene, chloroalkylbenzenes, and other chloro-aromatic and chloroalkyl aromatic hydrocarbons having at least two replaceable nuclear hydrogen atoms. In the chloro-aromatic compounds mentioned above the chlorine is attached directly to the aromatic ring. Of these different aromatic compounds the benzenoid compounds are preferred reactants in my resin-forming process. However, while benzene may be used in admixture with larger amounts of the alkyl aromatic and chloroaromatic compounds, benzene alone is unsuitable for the reaction with a dichloroalkane because these two reactants yield an infusible resinous material which is substantially insoluble in organic solvents. Di-chloroalkanes also used as a starting material in my process for producing a synthetic resin may be represented by the formula $(C_nH_{2n})Cl_2$ according to which two chlorine atoms are combined with a polymethylene group in which $n$ is an integer of from 2 to generally about 5, although dichloroalkanes with more than five carbon atoms may sometimes be used. Ethylene dichloride, also known as 1,2-dichloroethane, is a preferred dichloroalkane for my resin-forming process but other alkylene dichlorides, such as propylene dichloride as well as 1,1- and 1,3-dichloroalkanes and other dichloroalkanes may also be used. When a higher molecular weight dichloroalkane is employed such as a di-chlorobutane or dichloropentane, it is usually necessary to heat the reaction product or to subject it to a distillation at reduced pressure to remove certain non-resinous products which are sometimes formed in the process.

In the case of these higher molecular weight dichloroalkanes, some hydrogen chloride is evolved as the result of side reactions involving only the dichloroalkane so that the final amount of hydrogen chloride evolution corresponding to production of a satisfactory resin is somewhat higher than that evolved when employing ethylene dichloride. When ethylene dichloride is one of the reactants, I have found that from about 1.2 to about 1.9 moles of hydrogen chloride should be evolved per mole of aromatic hydrocarbon consumed in order to produce a high quality resin.

My resin-forming process is carried out in the presence of a Friedel-Crafts metal halide catalyst. Of these catalysts aluminum chloride, aluminum bromide, and ferric chloride are particularly effective. Other Friedel-Crafts metal halide catalysts may also be employed, although not necessarily with equivalent results or at the operating conditions used with catalysts comprising compounds of aluminum and a middle halogen, namely, chlorine and bromine.

My invention comprises an improvement in the preparation of a resin for use in varnishes and coating compositions which comprises reacting a hydrocarbon fraction containing saturated hydrocarbons and aromatic compounds represented by the formula $R^1$—Ar—$R^2$ wherein $R^1$ represents a member of the group consisting of a chlorine atom and an alkyl group of less than five carbon atoms, $R^2$ represents a member of the group consisting of a hydrogen atom, a chlorine and an alkyl group of less than five carbon atoms, and Ar represents an aromatic hydrocarbon group having at least two replaceable nuclear hydrogen atoms. The process is particularly effective for producing a resin by reacting an alkylene dihalide, such as ethylene dihalide, with a hydrocarbon fraction containing paraffins, naphthenes, and alkyl benzene hydrocarbons, the latter having at least two replaceable nuclear hydrogen atoms and having alkyl groups containing not more than five carbon atoms. The alkyl aromatic hydrocarbon contained in the straight-run naphtha is reacted in the presence of a Friedel-Crafts metal halide catalyst with a dichloroalkane under conditions such that the ratio of excess dichloroalkane to saturated hydrocarbons present at the completion of the reaction is greater than two. This value of at least 2 for the ratio of the excess dichloroalkane to saturated hydrocarbons in the reaction mixture is critical. If smaller amounts of dichloroalkane are employed, precipitation of the resinous reaction products takes place before completion of the reaction and the resultant insoluble resinous products are neither thermoplastic nor are they convertible into clear, soluble resins. However, by following the procedure outlined herein and employing the necessary excess of dichloroalkane, the reaction mixture is homogeneous at all times and substantially all of the resinous reaction product remains in solution until completion of the reaction.

My process is carried out using batch or continuous types of operation. Thus a straight-run naphtha fraction generally boiling from about 50° to about 250° C. and containing an alkyl aromatic hydrocarbon in admixture with saturated hydrocarbons comprising paraffins and naphthenes, is mixed with a dichloroalkane and the mixture is heated in the presence of a finely divided Friedel-Crafts metal halide catalyst such as aluminum chloride. The dihaloalkane is charged to the process in an amount sufficient so that at least two molecular proportions of dihaloalkane will remain in the reaction mixture per molecular proportion of saturated hydrocarbon also present therein. The amount of dichloroalkane charged to the process is thus depended upon the saturated hydrocarbons, that is, paraffins and naphthenes, also introduced into the reaction mixture, As the alkyl aromatic hydrocarbon charged to the process reacts with an approximately equal molecular proportion of dichloroalkane when the condensation reaction is complete, the amount of dichloroalkane charged to the process must be at least equivalent to the sum of the molecular proportions of alkyl aromatic hydrocarbon and twice the molecular proportion of saturated hydrocarbons charged to the process.

The reaction mixture of alkyl aromatic hydrocarbon, saturated hydrocarbons, dichloroalkane and catalyst are maintained at a temperature of from about 60° to about 100° C. for a time, generally from about 0.75 to about 24 hours sufficient to effect the evolution of between about 1.2 and about 1.9 moles of hydrogen chloride per mole of alkyl aromatic hydrocarbon reacting. As the hydrogen chloride tends to inhibit the reaction, it is removed continuously from the reaction zone in order to insure that the reaction proceeds smoothly to completion.

After the necessary quantity of hydrogen chloride has been evolved, the reaction mixture is then decomposed with water and the aqueous layer is separated from the organic reaction products. Steam distillation of the organic reaction product removes unreacted starting material from a plastic residue which is then heated at a temperature of from about 90° to about 200° C. until frothing has ceased. The resultant material upon being cooled sets quickly to a hard, pale, clear resin which has a relatively high solubility in hydrocarbon solvents, chlorinated hydrocarbons, and in other organic solvents, such as esters, ketones, glycol esters and glycol ethers.

The first step of the reaction must be carefully controlled, as over-reaction gives a product which is not convertible to a clear, soluble resin. Completion of the first step of the reaction is best indicated by the amount of hydrogen chloride evolved. If the reaction mixture is of low paraffin-naphthene content, completion of the reaction may also be indicated by an increase in the viscosity of the reaction mixture and a slight swelling. This criterion is not too reliable, however, since in some cases the reaction is best terminated just before such swelling sets in. If the reaction is continued beyond the correct end point, the product after hydrolysis and separation from unreacted materials is a hard, opaque, slightly soluble resin which chars upon heating. If the primary reaction is stopped before the indicated point, the product after hydrolysis, is a viscous liquid. The separation of unreacted material, such as excess dihaloalkane or saturated hydrocarbons present in the hydrocarbon fraction employed, is preferably effected by steam distillation.

Resins of somewhat different properties may be obtained by reacting a mixture of an alkyl aromatic hydrocarbon and a chloro-aromatic hydrocarbon, the latter obtained, for example, by the chlorination of a straight-run naphtha containing aromatic hydrocarbons or by substituting a nuclearly chlorinated hydrocarbon for some of the alkyl aromatic hydrocarbon charging stock in the process of this invention. The presence of halogen combined with the nucleus of an aromatic hydrocarbon modifies the solubility of the resinous product formed from such a halo aromatic compound and also the presence of the halogen may have an influence on the speed of the resin-forming reaction. Thus I have found that monochlorobenzene is considerably more reactive in this resin-forming reaction than is toluene or xylene while dichlorobenzene has about the same order of reactivity as that of toluene or xylene. No substantial amounts of nuclearly substituted halogen are lost as hydrogen halide during the condensation of a halo aromatic hydrocarbon with a dichloroalkane as set forth herein.

The following examples are introduced to illustrate some specific operations of my invention but should not be construed as limiting the broad scope of the invention in accordance with the data submitted.

*Example I*

A straight-run xylene fraction containing 80 per cent of paraffins and naphthenes was reacted with ethylene dichloride in the presence of an aluminum chloride catalyst. Four moles of ethylene dichloride were charged per mole of aromatic. The mixture was heated at a temperature of 60° C. until the evolution of hydrogen chloride was equal to 1.46 moles per mole of aromatic consumed. The reaction mixture was then decomposed with water, the aqueous layer separated from the organic material and the unreacted material separated by steam distillation; the molar ratio of excess ethylene dichloride to paraffins and naphthenes was about 0.74. The residue was heated at a temperature from about 90° to 200° C. until frothing ceased. The product was not useful as a resin as it was a putty-like solid which was insoluble in organic solvents and did not have a measurable softening point.

*Example II*

The naphtha fraction in this case contained 60 per cent of paraffins plus naphthenes and was reacted with ethylene dichloride (four moles per mole of aromatics) as described in Example I. The evolution of hydrogen chloride in this case was equal to 1.55 moles per mole of aromatic used. The same procedure was followed as in the previous example and the resultant product was a porous solid having poor solubility and no distinct softening point. The molar ratio of excess ethylene dichloride to paraffins and naphthenes was about 1.85.

*Example III*

A naphtha fraction containing 40 per cent of saturated hydrocarbons was reacted as outlined (again with an initial charge of 4 moles of ethylene dichloride per mole of aromatics) until completion of the condensation; 1.58 moles of hydrogen chloride was recovered per mole of aromatic consumed. The product was a clear, solid, transparent, resin having good solubility and a softening point of 82° C. The mole ratio of unreacted ethylene dichloride to paraffins and naphthenes was about 4.5.

*Example IV*

A naphtha fraction containing 20 per cent of saturated non-aromatic hydrocarbons was reacted with ethylene dichloride in the same proportions as before until the condensation reaction was completed, the evolution of hydrogen chloride being equal to 1.58 moles per mole of aromatic used. The product, again, was a solid resin, having a softening point of 87° C. and good solubility in organic solvents. The mole ratio of excess ethylene dichloride to paraffins and naphthenes was about 11.5.

*Example V*

The same straight-run xylene fraction used in Example I (containing 80 per cent of saturated hydrocarbons) was reacted with ethylene dichloride in the presence of aluminum chloride, 20 moles of ethylene dichloride being employed per mole of aromatic. The reaction mixture was heated at 60° C. until the condensation was completed, 1.80 moles of hydrogen chloride being recovered per mole of aromatic charged. After hydrolyzing the reaction mixture and treating the plastic residue as hereinabove described, a solid resinous product suitable for use in coating compositions was obtained. The product had a softening point of 90° C. and excellent solubility in organic solvents. The ratio of excess ethylene dichloride to paraffins and naphthenes was about 4.7.

It should be noted that in spite of the fact that the reaction of Example V was carried farther than that of Example I, the final product of Example V was a clear, soluble resin, while that of Example I was opaque and difficultly soluble. The effect of the increased ratio of ethylene dichloride to paraffinic material is thus quite clear.

Example VI

A straight-run naphtha fraction rich in aromatics was mixed with 2.5 moles of propylene dichloride (based on the aromatics present) and the condensation effected in the presence of aluminum chloride at a temperature of 60° C. After 2.2 moles of hydrogen chloride per mole of aromatics had been evolved, the reaction mixture was hydrolyzed with water, the organic material separated from the aqueous layer, and the unreacted material separated from the higher boiling products. The latter comprised a viscous fluid which was separable by vacuum distillation into 57 per cent of an organic liquid overhead and 43 per cent of a resinous residue melting at 104° C.

Example VII

An aromatic fraction containing 60 per cent of aromatic hydrocarbons (10 per cent benzene and 50 per cent of toluene plus xylenes) and 40 per cent of saturated hydrocarbons was treated with 2.5 moles of ethylene dichloride (based on the aromatics present) in the presence of aluminum chloride at 60 to 70° C. until 1.7 moles of hydrogen chloride were evolved per mole of aromatic. After the usual decomposition and recovery of the product, a hard resinous material was obtained which melted at about 76° C.

Example VIII

Commercial diamylbenzenes were mixed with 2.5 moles of ethylene dichloride and condensation was effected in the presence of aluminum chloride at a temperature which was gradually raised from 60° to 93° C. When 1.4 moles of hydrogen chloride had been liberated per mole of aromatic, the reaction mixture was decomposed with water and the resinous product recovered in the usual way. The product had a softening point of 65° C. During formation of the resin approximately 0.5 mole of hydrocarbon gases (chiefly isopentane) were evolved.

Example IX

Partial chlorination of a naphtha fraction similar in composition to that charged in Example VII was carried out in a steel reactor in the presence of an iron catalyst at a temperature of 20 to 30° C. to yield a mixture consisting of 15 per cent chlorobenzene hydrocarbons, 45 per cent of benzene hydrocarbons, having 6 to 8 carbon atoms per molecule and 40 per cent of saturated hydrocarbons (paraffins and naphthenes). One molecular proportion of the chlorinated naphtha fraction, 2.5 molecular proportions of ethylene dichloride, and 0.03 molecular proportion of aluminum chloride were reacted at a temperature of 60° C. for a time of 4.7 hours during which a total of 1.3 molecular proportions of hydrogen chloride were evolved. The resultant reaction product yielded a yellow, plastic resin with a softening point of 72° C. This resin was soluble in organic solvents.

Example X

Another partially chlorinated naphtha fraction similar to that referred to in Example IX, but containing about 10 per cent of ortho-dichlorobenzene was reacted with 2.5 molecular proportions of ethylene dichloride and 0.13 molecular proportion of aluminum chloride at a temperature of 60° C. for a time of 5.2 hours during which 1.6 molecular proportions of hydrogen chloride were evolved. In this reaction, 1.05 molecular proportions of ethylene dichloride reacted per molecular proportion of ortho-dichlorobenzene undergoing reaction. The resultant reaction product yielded a resin in the form of a brittle solid with a melting point of 93° C. and having good solubility in organic solvents.

The naphtha fractions used in my process are preferably those containing from about 10 to about 60 mole per cent of aromatic hydrocarbons, mainly alkyl aromatics having at least two replaceable nuclear hydrogen atoms per molecule, and 10 to 90 mole per cent of saturated hydrocarbons comprising paraffins and cycloparaffins. The use of a naphtha fraction containing less than about 10 mole per cent of usable aromatic hydrocarbons would require the simultaneous charging of a very large amount of dichloroalkane, while naphtha fractions or concentrates containing more than about 60 mole per cent of usable aromatics are usually too expensive for producing resins economically.

The nature of the present invention and type of results obtained thereby are evident from the preceding specification and examples, although neither section should be misconstrued to limit its generally broad scope.

I claim as my invention:

1. A process for preparing a resin which comprises reacting a dichloroalkane having from two to five carbon atoms per molecule and a fraction containing paraffins, cycloparaffins, a chloroaromatic hydrocarbon and an alkyl aromatic hydrocarbon having at least two replaceable nuclear hydrogen atoms at a temperature of from about 60° to about 100° C. in the presence of a Friedel-Crafts metal halide catalyst, continuing the reaction for a time period of from about 0.75 to about 24 hours, preventing precipitation of the resultant resinous product by maintaining a mole excess of dichloroalkane during the reaction such that upon completion of the reaction the mole ratio of unreacted dichloroalkane to the sum of said paraffins and cycloparaffins is at least 2:1, and recovering the dissolved resinous product from the final reaction mixture.

2. A process for producing a resinous product from a partially chlorinated straight-run petroleum naphtha fraction containing a chlorobenzene, saturated hydrocarbons and alkyl benzene hydrocarbons having at least two replaceable nuclear hydrogen atoms per molecule, which comprises reacting the partially chlorinated fraction with a dichloroalkane having from two to five carbon atoms per molecule in the presence of a Friedel-Crafts metal halide catalyst at a temperature of from about 60° to about 100° C., continuing the reaction for a time period of from about 0.75 to about 24 hours, preventing precipitation of the resultant resinous product by maintaining a mole excess of dichloroalkane during the reaction such that upon completion of the reaction the mole ratio of unreacted dichloroalkane to said saturated hydrocarbons is at least 2:1, and recovering the dissolved resinous product from the final reaction mixture.

3. The process of claim 2 further characterized in that said dichloroalkane is ethylene dichloride.

4. The process of claim 1 further characterized in that said chloro-aromatic hydrocarbon is a nuclearly chlorinated benzene hydrocarbon.

5. The process of claim 1 further characterized in that said dichloroalkane is ethylene dichloride.

HERMAN S. BLOCH.

REFERENCES CITED

The following references are of record in the file of this patent:

UNITED STATES PATENTS

| Number | Name | Date |
| --- | --- | --- |
| 2,265,847 | Laughlin et al. | Dec. 9, 1941 |